United States Patent [19]

Toi et al.

[11] 4,447,020
[45] May 8, 1984

[54] MAGNETIC RECORDING TAPE CARTRIDGE

[75] Inventors: Mitsuharu Toi, Kyoto; Hiroyoshi Takagi, Kameoka, both of Japan

[73] Assignee: Hitachi Maxell, Ltd., Osaka, Japan

[21] Appl. No.: 377,825

[22] Filed: May 13, 1982

[30] Foreign Application Priority Data

May 14, 1981 [JP] Japan ............................... 56-70253[U]

[51] Int. Cl.³ .......................... G03B 1/04; G11B 15/32
[52] U.S. Cl. ....................................... 242/198; 360/132
[58] Field of Search ............................... 242/197–200; 360/93, 96.1, 132; 352/72, 78 R

[56] References Cited

U.S. PATENT DOCUMENTS 4,106,724  8/1978  Higashida ........................... 242/198
4,195,797  4/1980  Okamura et al. ................... 242/199

Primary Examiner—Leonard D. Christian
Attorney, Agent, or Firm—Birch, Stewart, Kolasch and Birch

[57] ABSTRACT

A magnetic recording tape cartridge comprising a pair of tape reels each having a bottom flange with a plurality of engaging teeth on the peripheral edge of the bottom flange and a tape reel stopping means for engagement of one of the engaging teeth of the tape reel, the tape reel stopping means being biassed by a resilient plate spring to prevent undesired rotation of the tape reel.

4 Claims, 12 Drawing Figures

PRIOR ART

MAGNETIC RECORDING TAPE CARTRIDGE

FIELD OF THE INVENTION

The present invention relates to a magnetic recording tape cartridge which is characterized by the construction of a tape reel locking mechanism.

BACKGROUND OF THE INVENTION

In a conventional magnetic recording tape cartridge for a video tape recorder, the tape reels contained in the cartridge case are prevented from idle rotation by a tape reel locking mechanism so that the magnetic recording tape wound around the tape reels is not loosened when the cartridge is not being used, and locking of the tape reels is released when the cartridge is mounted in a video tape deck.

FIG. 9 shows a typical example of a conventional tape reel locking mechanism, which comprises a pivotal shaft 7 and a spring bearing member 8 provided in the inner bottom surface of a bottom section 1b of a cartridge case 1 in the rear central portion thereof, and a boss 13 of a tape reel stopper 10 is rotatably engaged with the pivotal shaft 7. The pivotal shaft 7 is further engaged with a central helical portion 11'a of a helical spring 11', one end of which is supported by the spring bearing member 8 and the other is supported by a spring bearing portion of the tape reel stopper 10, the tape reel stopper 10 being rotatingly pressed by the elastic force of the helical spring 11' in a certain direction so that a rotation preventing member 14 of the tape reel stopper 10 is engaged with teeth 5 which are continuously formed along the outer periphery of a lower flange 2b of the tape reel 2 so as to prevent the tape reel 2 from idle rotation when the magnetic recording tape cartridge is not being used. On the other hand, when the magnetic recording tape cartridge is mounted on a video tape deck, the tape reel stopper 10 is forcibly rotated against the helical spring 11' in such a direction that the rotation preventing member 14 is disengaged from the teeth 5, thereby automatically releasing the locking of the tape reels.

Such construction is, however, disadvantageous in employing the helical spring 11'. That is, when assembling the helical spring 11' into the tape reel locking mechanism, both ends thereof should be elastically deformed in a compressed condition followed by engagement of the central helical portion 11'a with the pivotal shaft 7, and thereafter the ends of the helical spring 11' should be brought into contact respectively with the spring bearing member 8 and the tape reel stopper 10 to be supported thereby. Such assembly work is troublesome and should be conducted by hand, and thus the helical spring cannot be automatically assembled into the tape reel locking mechanism. Further, ends of the helical spring 11' of this kind tend to move in the upper and lower directions respectively, leading to deterioration of the spring characteristics and to the apprehension that the helical spring 11' on the assembly line will be sprung out of place by a slight vibration. Still further, a helical spring is generally costly in comparison with a plate spring.

SUMMARY OF THE INVENTION

An essential object of the present invention is to overcome the aforementioned disadvantages of the prior art by providing a magnetic recording tape cartridge having an improved tape reel locking mechanism in which a plate spring is used as a spring member constituting the tape reel locking mechanism in substitution for the helical spring. The present invention endeavors to improve assembling workability, simplify automatic assembling, improve spring characteristics and reduce the manufacturing cost, and further aims at securely holding the plate spring in a standard position without displacement in any direction.

DESCRIPTION OF THE PREFERRED EMBODIMENTS

Figure 1:
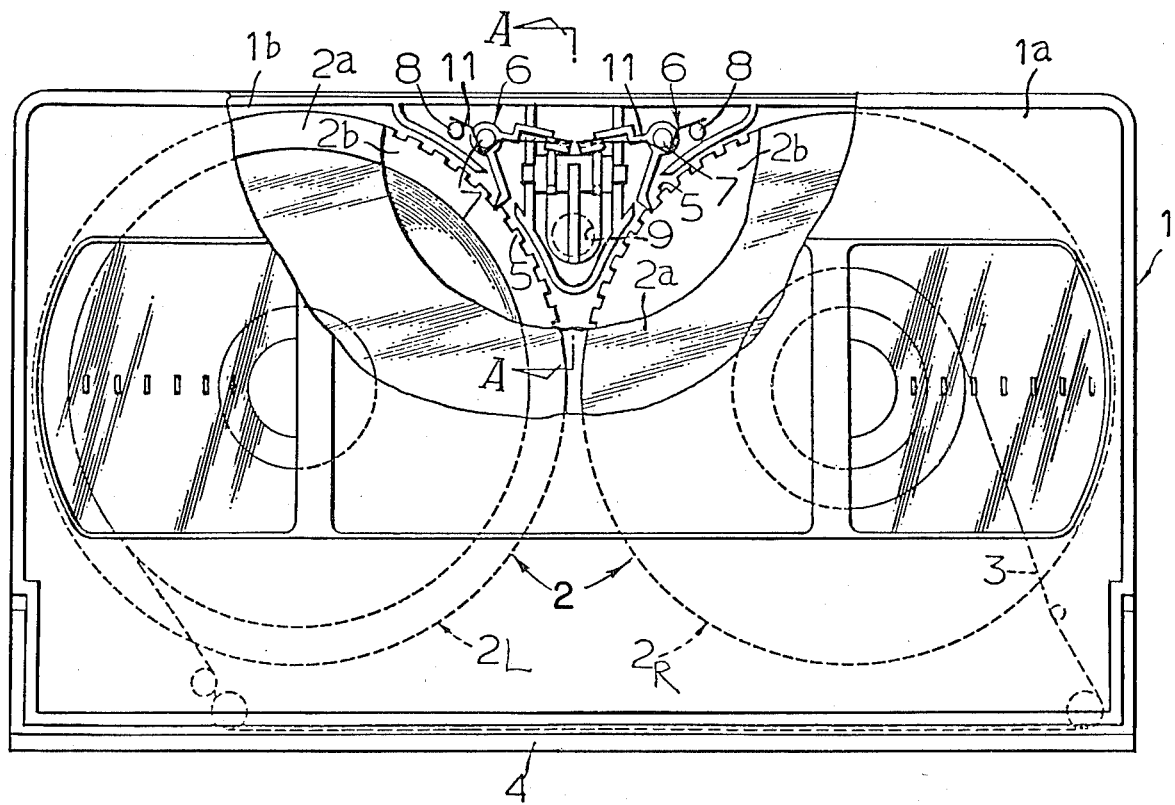
FIG. 1 is a partially fragmentary top plan view of the magnetic recording tape cartridge according to the present invention.

Referring now to FIG. 1 of the drawings, there is shown a magnetic recording tape cartridge according to the present invention for a video tape recorder, which comprises a cartridge case 1 composed of a top section 1a and a bottom section 1b both made of a plastic resin material and connected together by screws. A pair of tape reels 2 (2R & 2L) are rotatably provided within the cartridge case 1 for winding a magnetic recording tape 3. The magnetic recording tape 3 is drawn out frontwardly of the cartridge case 1 from a supply reel 2R shown in the right-half part and taken up around a take-up reel 2L shown in the left-half part. A front lid member 4 is pivotally mounted on the front face of the cartridge case 1 for covering and protecting the outer surface of the magnetic recording tape 3 when the magnetic recording tape cartridge is not used.

Each of the tape reels 2R and 2L has upper and lower flanges 2a and 2b, and the lower flange 2b is continuously provided along its outer periphery with teeth 5.

Figure 2:
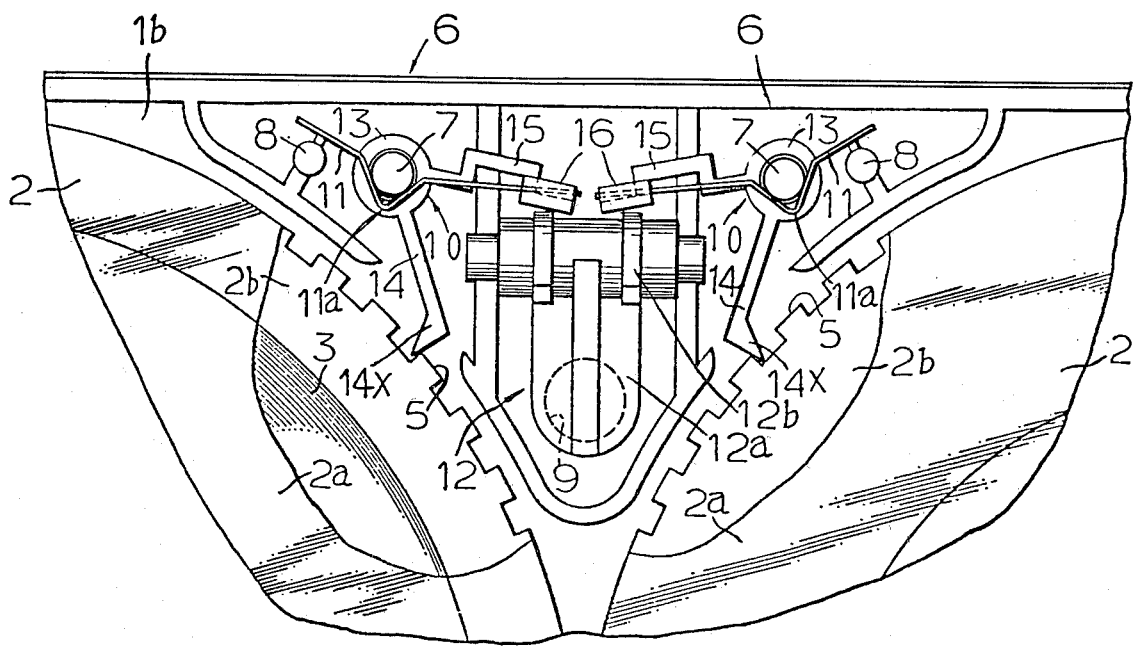
FIG. 2 is an enlarged top plan view of an essential portion of a tape reel locking mechanism.
Figure 3:
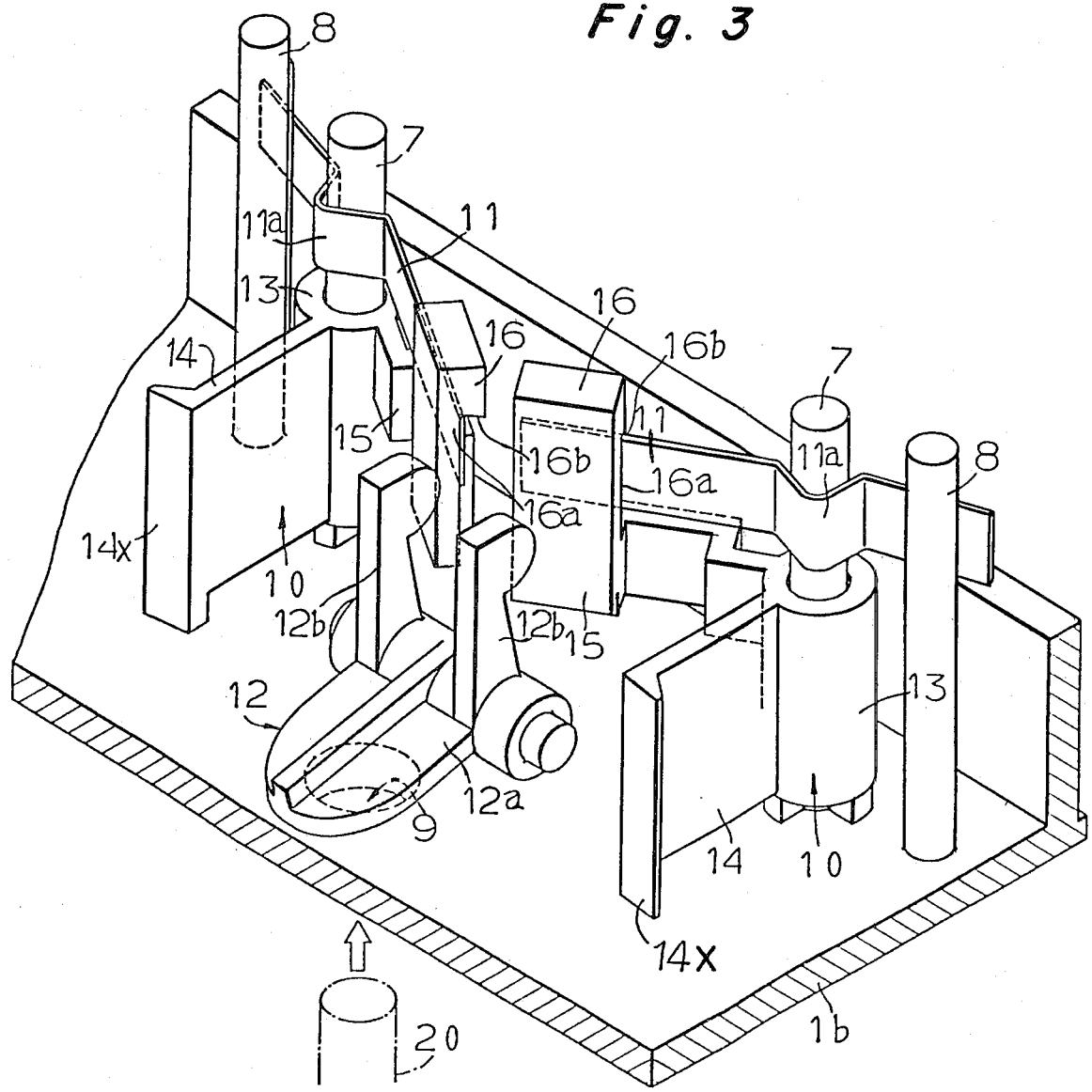
FIG. 3 is a perspective view of the tape reel locking mechanism.
Figure 4:
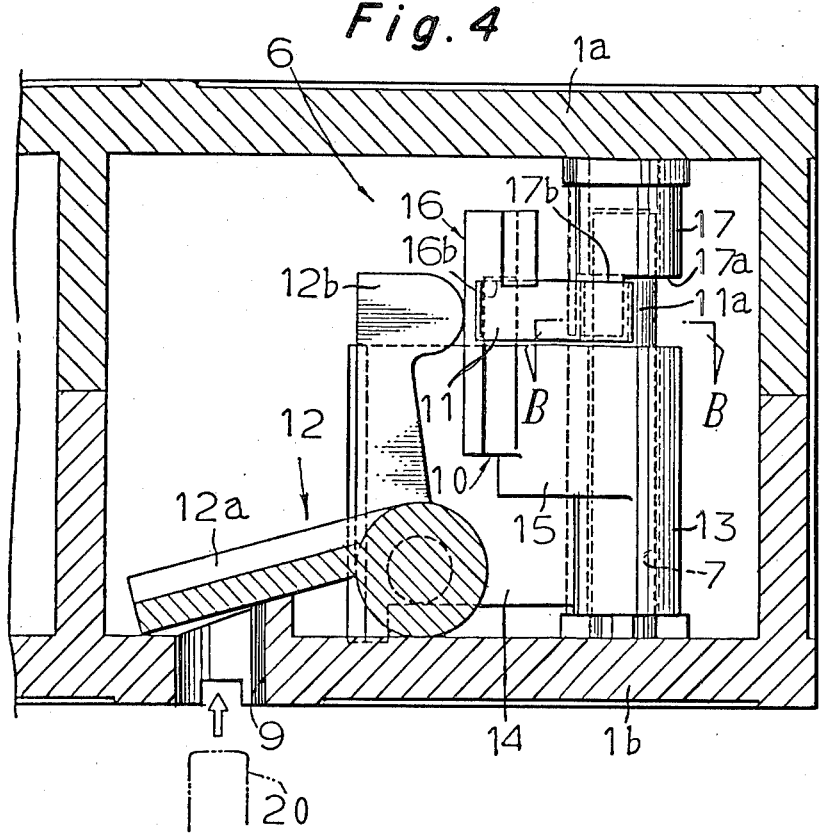
FIG. 4 is a cross sectional view taken along the line A—A of FIG. 1.

In FIGS. 2 to 4, there is shown a tape reel locking mechanism 6 which is provided in the rear central portion of the inner space of the cartridge case 1.

The tape reel locking mechanism 6 comprises a pair of pivotal shafts 7 integrally provided on the inner bottom surface of the bottom section 1b, a pair of spring bearing members 8 also integrally provided on the bottom section 1b in the vicinity of and outwardly of the pivotal shafts 7 and a through-hole 9 formed frontwardly of the pivotal shafts 7. The tape reel locking mechanism 6 further includes a pair of tape reel stoppers 10, a pair of plate springs 11 and a handle member 12.

Each of the tape reel stoppers 10 is formed by a plastic resin material and has a vertical cylindrical boss 13 provided in its bottom end portion, a rotation preventing member 14 and a locking release member 15 respectively extending from the boss 13 and a spring bearing portion 16 upwardly projecting from the upper end of the locking release member 15. The boss 13 is rotatably engaged with the pivotal shaft 7 from above. The spring bearing portion 16 has a vertical flat surface 16a and a displacement preventing surface 16b which is continuous from the upper end of the flat surface 16a and inclined downwardly.

Figure 5:
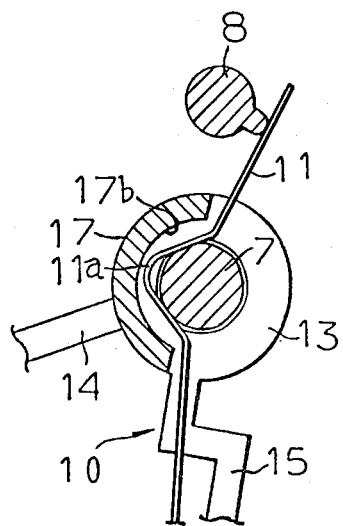
FIG. 5 is a cross-sectional view taken along the line B—B of FIG. 4.

Each plate spring 11 is in the form of a flat plate having a certain vertical width with a suitable elasticity, and has in its center a bent portion 11a which is formed in the form of a V-character in transverse cross section. The plate spring 11 is inserted from above into a space defined by the pivotal shaft 7, the spring bearing member 8 and the tape reel stopper 10 in a horizontal attitude so that the bent portion 11a is engagedly in contact with the pivotal shaft 7 and both end portions of the plate spring 11 are respectively supported by the spring bearing member 8 and by the spring bearing flat surface 16a of the tape reel stopper 10. The pivotal shaft 7 and the spring bearing member 8 are fixed so as to give elastic force to the plate spring 11. By virtue of the elastic force of the plate spring 11, the tape reel stopper 10 is forced to be rotated about the pivotal shaft 7 so that the free end portion 14X of the rotation preventing member 14 is detachably engaged with the teeth 5 of the tape reel 2. The plate spring 11 thus placed in position is prevented from upward displacement by the displacement preventing surface 16b. Further, as shown in FIGS. 4 and 5, upon assembling of the bottom section 1b and the top section 1a, each of a pair of cylindrical projections or guide members 17 provided in the inner surface of the top section 1a is engaged with the pivotal shaft 7 so as to be in contact with the upper edge of the plate spring 11 and prevent upward movement of the same. The lower end portion of the projection 17 is provided with a contact surface which comes in contact with the upper edge of the bent portion 11a of the plate spring 11 when the same is moved up and a downwardly extending surface 17b which comes in contact with the outer side surface of the bent portion 11a when the same is horizontally moved and separated from the pivotal shaft 7.

Figure 6:
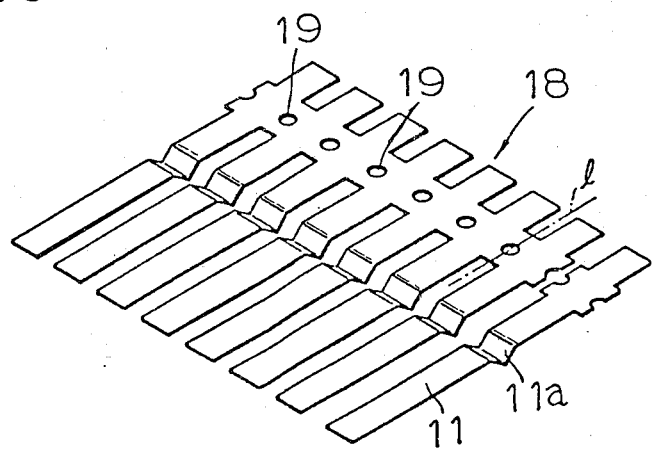
FIG. 6 is a perspective view showing the blank material for manufacturing a plate spring.

The plate spring 11 is made of a resilient material such as stainless steel or phosphorus bronze plate. For manufacturing the plate spring 11, as shown in FIG. 6, a strip-formed blank material 18, so-called a hoop, is subjected to press work in the longitudinal direction to form the bent portions 11a while a plurality of feeding holes 19 are formed longitudinally along one end portion at regular intervals. The blank material 18 is rolled up and is fed through the feeding holes 19 at certain feeding pitches and cut along the line 1. This facilitates satisfactory yield of the material and enables large-scale production, thereby considerably reducing the manufacturing cost of the plate spring 11 itself.

The handle member 12 is formed of a plastic resin material and comprises a horizontal plate member 12a and a pair of vertical members 12b, and is pivotally supported by the inner surface of the bottom section 1b so that the horizontal plate member 12a covers the through-hole 9 and the vertical members 12b contact with the locking release members 15 of the tape reel stoppers 10.

Since the plate spring 11 assembled in the aforementioned manner is supported in a condition that the central bent portion 11a is detachably engaged with the pivotal shaft 7, the plate spring 11 is prevented from displacement in the longitudinal or lateral direction thereof. The plate spring 11 is further prevented from upward movement by the cylindrical projection 17 of the top section 1a and the displacement preventing surface 16b of the spring bearing portion 16 of the tape reel stopper 10, and the central bent portion 11a is prevented from separation from the pivotal shaft 7 by the downwardly extending member 17b of the cylindrical projection 17. Thus, the plate spring 11 is appropriately held in a standard position keeping a horizontal attitude so that each of the tape reel stoppers 10 can be rotated in a desired direction and the rotation preventing member 14 of the tape reel stopper 10 is securely engaged with the teeth of the tape reel 2 to prevent idle rotation of the tape reel 2 when the magnetic recording tape cartridge is not in use. On the other hand, when the magnetic recording tape cartridge is mounted in a video tape deck, a push member 20 of the video tape deck as shown in FIG. 4 enters the through-hole 9 to push up the handle member 12 so that the handle member 12 is rotated to thereby rotate the tape reel stopper 10 against the plate spring 11 and the rotation preventing member 14 is disengaged from the teeth 5 so as to release the locking of the tape reel 2.

It is to be noted that the present invention is not limited to the embodiment shown in FIGS. 1 to 6.

Figure 7A:
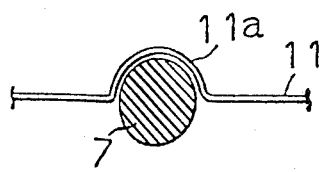
FIGS. 7(a) through 7(c) are top plan views respectively showing modifications of the plate spring.
Figure 7B:
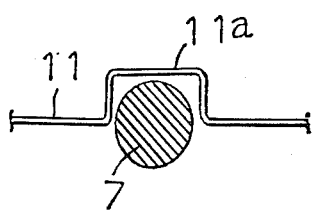

For example, the form of the bent portion 11a of the plate spring 11 may be semicircular in plan view as shown in FIG. 7(a) for close contact with the outer periphery of the pivotal shaft 7, or may be rectangular in plan view as shown in FIG. 7(b).

Figure 7C:
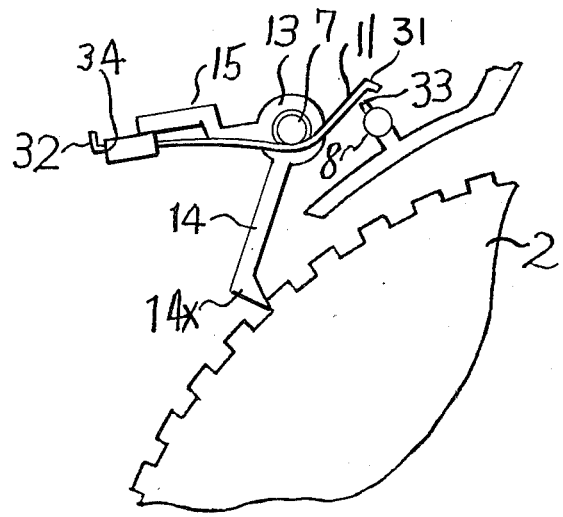

A further modification of the plate spring 11 is shown in FIG. 7(c) wherein the plate spring 11 has bent portions 31 and 32 on both ends thereof for engagement of the corresponding projected rib 33 and the end wall 34 of the locking releasing member 15. Said projected rib 33 is formed on the surface of the spring bearing member 8 so as to be radially projected therefrom along the vertical axis of the spring bearing member 8. In this embodiment, leftward displacement of the plate spring 11 is limited by the engagement of the bent portion 31 onto the projected rib 33 and rightward displacement of the plate spring 11 is limited by the engagement of the bent portion 32 onto the wall 34.

Figure 7D:
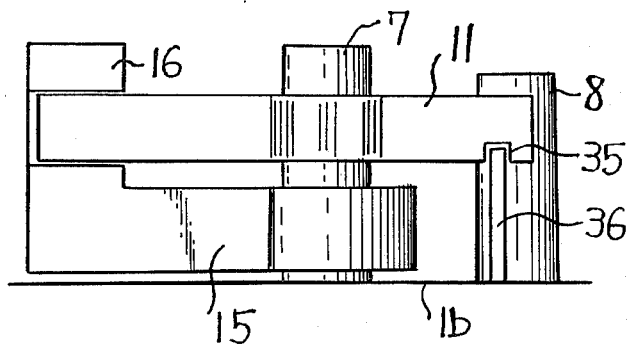
FIG. 7(d) is a side view showing a further modification of the plate spring.

A further modification of the plate spring 11 is shown in FIG. 7(d), wherein the plate spring 11 is provided with a recess 35 in the lower edge portion of the plate spring 11 so that the recess 35 is engaged with the top portion of the projected rib 36 formed on the spring bearing member 8. In this embodiment, the plate spring 11 may be formed from a generally flat plate, and the plate spring 11 can be mounted in a similar manner as explained above.

Figure 8:
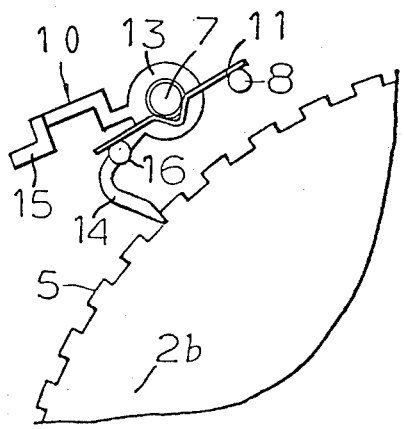
FIG. 8 is a top plan view of an essential portion of another embodiment of the present invention.
Figure 9:
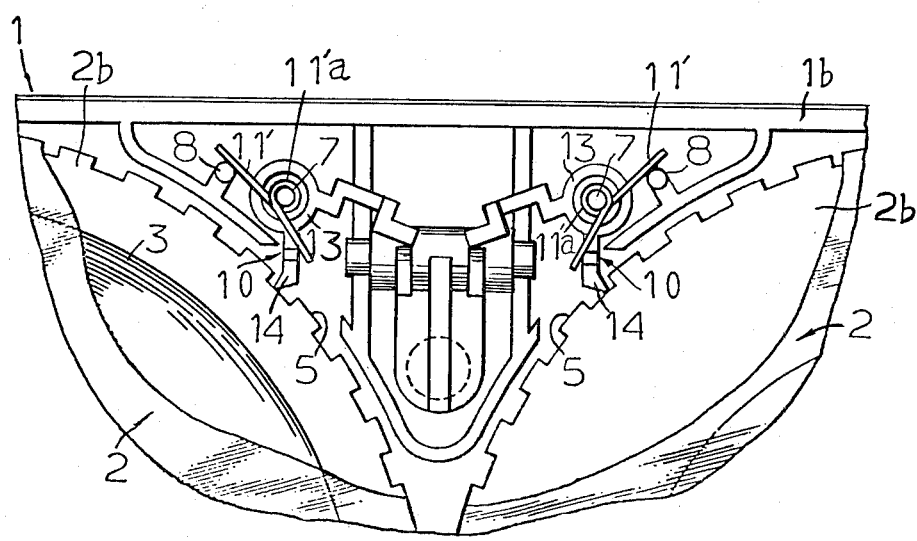
FIG. 9 is an enlarged top plan view of an essential portion of a conventional tape reel locking mechanism.

Further, as shown in FIG. 8, a spring bearing portion 16 may be provided in the rotation preventing member 14 of the tape reel stopper 10 so that one end of the plate spring 11 is supported by the spring bearing member 8 and the other end is supported by the spring bearing portion 16. In this case, the locking release member 15 of the tape reel stopper 10 may be omitted and locking of the tape reels 2 may be released by other release means.

Though the embodiment is shown as a VHS type magnetic recording tape cartridge, the present invention may effectively be applied also to a beta type magnetic recording tape cartridge. In this case, the tape reel locking mechanism may be provided in a separated pair to be placed in left and right portions of the cartridge case 1, and locking of the tape reels 2 may be released in association with the opening of the front lid member 4.

As hereinabove described, since the present invention employs the plate spring 11 in place of the conventional helical spring, the plate spring 11 can be easily mounted in a desired position by merely inserting the same from above into the tape reel locking mechanism to improve assembling workability thereof and facilitate automatic assembling of the mechanism. Further, according to one feature of the embodiment of the present invention, since the plate spring 11 has in its center the bent portion 11a, which is in contact with the pivotal shaft 7 to prevent longitudinal or lateral displacement of the plate spring 11, the plate spring 11 can be stably held in a horizontal attitude and can always be prevented from displacement in any direction after assembly. Thus, the plate spring 11 can efficiently apply elastic force to the spring bearing portion 16 of the tape reel stopper 10 without undesired deformation. Further, since the plate spring 11 itself can be produced from blank material on a large scale, the manufacturing cost thereof can be reduced.

The invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A magnetic recording tape cartridge which comprises:
   a bottom section,
   a top section mated with said bottom section to form a cartridge case,
   a pair of tape reels each having a flange and a hub member on which a magnetic recording tape is wound, said flange being provided with a plurality of engaging teeth on the peripheral edge of said flange,
   a tape reel stopping means having a boss member, a first arm extending radially from said boss member to provide a rotation preventing member which detachably engages with one of the engaging teeth of said flange and a second arm extending from said boss member with a spring receiving member formed on a free end thereof, said tape reel stopping means being rotatably pivoted on pivotal shafts of the bottom section, and
   a resilient plate spring formed by a generally flat plate having its intermediate portion bent, said plate spring being situated standing vertically in a space defined by said boss member of the tape reel stopping means and a spring supporting member formed on the bottom section with one flat end of the plate spring being received by said spring receiving member, said bent portion of the plate spring being engaged with one of said pivotal shafts for preventing lateral displacement of said plate spring, said plate spring biasing said second arm of said tape reel stopping means for engagement of said rotation preventing member with one of the teeth of said flange, so that at least one of said tape reels is prevented from rotation when the magnetic recording tape cartridge is not being used.

2. The magnetic recording tape cartridge according to claim 1, wherein said bent portion is formed in the form of a V-character.

3. The magnetic recording tape cartridge according to claim 1, wherein said spring receiving member is in the form of a recess which engages with the one flat end portion of the plate spring.

4. The magnetic recording tape cartridge according to claim 1, wherein the top section further comprises a guide member projected to oppose the boss member of the tape reel stopping means with a gap therebetween, thereby the bent portion of the plate spring being disposed in the gap.

* * * * *